Nov. 29, 1960

YASUSHI HOSHINO ET AL

MEANS FOR COMPENSATING A RECORD FOR CHANGES IN ATMOSPHERIC CONDITIONS 2,962,559

Filed Aug. 28, 1958

3 Sheets-Sheet 1

United States Patent Office 2,962,559

Patented Nov. 29, 1960

2,962,559

MEANS FOR COMPENSATING A RECORD FOR CHANGES IN ATMOSPHERIC CONDITIONS

Yasushi Hoshino, 462 1-chome Tamagawa-Okusawacho, and Minoru Sato, 635 Ishikawacho, Apt. 168, both of Tokyo, Japan Filed Aug. 28, 1958, Ser. No. 757,875

Claims priority, application Japan Sept. 12, 1957

5 Claims. (Cl. 179—100.2)

The inventors disclosed a magnetic sound record reading machine in which a magnetic sound record, having on one surface a description relating to the content of the record and on the opposite surface a magnetic record film, is set on a panel of the machine to face the magnetic sound record film downwardly and said magnetic sound record film is recorded or reproduced by scanning of sound recording or reproducing heads provided on the circumference of a turntable which, being supported on a shiftable table, moves longitudinally along the center line of the magnetic sound record film while rotating (see United States patent application No. 635,335, filed January 22, 1957).

The present invention relates to the improvement of such a magnetic sound record reading machine. It will be apparent that it is important in the operation of such a magnetic sound record reading machine to set the magnetic sound record sheet in right position to secure correct scanning of the sound recording or reproducing heads of the turn table. However, the sheet is apt to shrink and elongate according to the change of temperature and humidity and it is not easy to set the sheet at the same position always at the time of reproducing sound as at the time of recording sound. When the sheet is set to have the beginning part of the sheet at the time of reproduction in the same position as at the time of recording sound, the ending part of the sheet may not be in correct position due to the elongation or shrinkage of the sheet.

Accordingly, the first object of the present invention is to provide a means of measuring the elongation or shrinkage occurred in the sheet and to adjust the shifting motion of the table carrying heads. The elongation or shrinkage of the sheet may be determined by measuring the length of a sample of the sheet by a scale or by measuring the length of the sheet itself directly. The change of the length may also be determined by a member of a material which changes its color according to the change of humidity by comparing the changed color of said member with the color of a material having standard color since the change of the length of the sheet is mainly caused through the change of humidity.

According to the present invention, a device is provided which drives the shiftable table at an adjusted speed according to the measured elongation or shrinkage at the time of reproduction. Thus the sound tracks on the magnetic sound sheet may be always scanned correctly despite the elongation or shrinkage of the sheet.

The second object of the present invention is to provide a device for marking various signs on the magnetic sound record sheet. It is very often desirable to have signs for indicating the part of the sheet by which the elongation or shrinkage is measured and also other signs such as a sign indicating the start of the recorded sound, a sign indicating the end of the recorded sound, or a sign indicating the change of subject matters when various subject matters are recorded on a sheet.

Another aspect of the present invention is to provide a means for controlling another device operated in coordination with the magnetic sound record reading machine. According to the present invention, such a device may be a contact which slides on the surface of the magnetic sound record sheet provided with holes or small sections of electrically conductive material and gives a sign for the operation of the coordinated device when the contact is brought to said hole or section of conductive material.

Still another aspect of the present invention is to provide a magnetic sound record reading machine having an auxiliary table or tables which are useful for supporting a book of a plurality of magnetic sound record sheets when one of the sheets is set on the machine for reproduction of sound or for writing on or reading of a sheet extended on the auxiliary table.

In order to facilitate a good understanding of the present invention, now it will be explained in detail with reference to accompanying drawings in which Fig. 1 is a perspective view illustrating one embodiment of the magnetic sound record reading machine according to the present invention, partly broken away to show the inside construction thereof;

Figures 1, 2, 3, 4, 5:
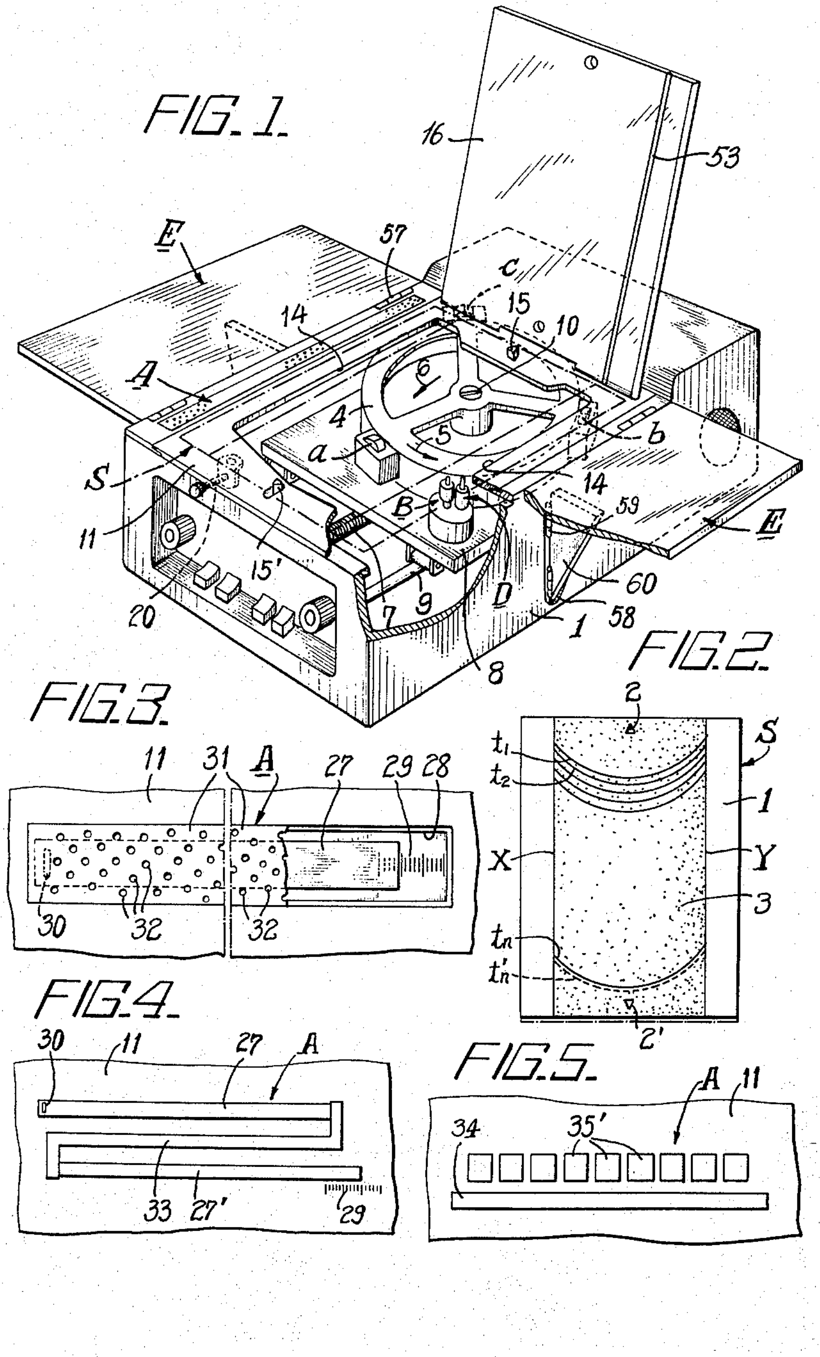
Fig. 2 is a plan view of a magnetic sound record sheet which has been elongated, as seen from the side of the magnetic sound record film.
Fig. 3 is a partial elevational view showing the part of the measurement device of the machine of Fig. 1, a part of which is broken away to show the inside.
Figs. 4 and 5 are plan views of different embodiments of the measurement device.

In Fig. 1, a turntable 4 has a plurality of magnetic sound recording or reproducing heads (three heads *a*, *b* and *c* in the embodiment illustrated) and is moved longitudinally in the direction of arrow 6 while being rotated in the direction of arrow 5. The operation of the turntable 4 is not the subject matter of the present invention, but it will be seen that the turntable is mounted on a shiftable table 8 (see also Fig. 11) which is moved longitudinally on rails 9 by the rotation of screw rod 7 through a nut 12 which is fixed on the shiftable table 8 while the turntable 4 is rotated by a shaft 10 in the direction of arrow 5. The casing 13 of the machine is provided with a panel which has a window 14. This panel is slidable minutely in opposite longitudinal directions, but the arrangement for this slidability is not shown in the drawing since it is not the subject matter of the present invention. Setting pins 15, 15' are provided on the panel 11 and a magnetic sound record sheet S may be set on the panel 11 in right position as shown by dot and chain lines by the engagement of the setting pins 15, 15' with the setting holes of the sheet S, the magnetic sound record film being faced downwardly. A pressing plate 16 made of transparent material such as glass is hinged on the casing 13 and is turned down on the magnetic sound record sheet S to keep it in expanded condition. When the turntable 4 is rotated in the direction of 5 and is moved in the direction of 6, one of the heads (*a*, *b* or *c*) comes in contact with the magnetic sound record film in turn and sound recording or reproducing is conducted by energizing the head.

A magnetic sound record sheet used in the apparatus comprises a basic sheet 1 of a material such as paper, plastic, or the like, and has a magnetic sound record film 3 coated on one surface of the sheet covering an area demarcated by two parallel lines X and Y as shown in Fig. 2. The sheet has setting holes 2 and 2' adapted to engage with the setting pins 15 and 15' on the panel 11 as explained above. On the other side of the sheet S, a description of letters, pictures or some others relating to the sound record on the other surface is provided and this description can be observed by the operator from tops through the transparent pressing plate 16. Thus the operator will have the benefit of simultaneous seeing and hearing for better understanding of the content of the sheet S.

However, some difficulties may be encountered through shrinkage or elongation of the sheet due to change of temperature and humidity inasmuch as the sheet is made of a material such as paper or plastic which is apt to shrink and elongate according to the change of temperature and moisture. For example, assume that recording is conducted in dry condition and sound tracks $t_1, t_2 \ldots t_n$ are formed. If the sound record of this sheet is to be reproduced when humidity is high and the sheet is elongated, the track $t_n$ will take the position of $t'_n$. Under such condition, the sound reproducing head will scan out of the track $t'_n$ and good sound recording is not obtainable.

In order to overcome such difficulty, it is desirable to have some means for eliminating this difficulty. For this purpose, the panel 11 may be moved gradually and minutely during reproducing operation according to shrinkage or elongation of the sheet under operation, or the amount of the longitudinal movement of the turntable 4 in the direction of arrow 6 may be adjusted.

Firstly, a device for measuring the elongation and shrinkage will be explained. According to one of the embodiments of the present invention, a sample 27 of the magnetic sound record sheet S in the condition of the time of sound recording is taken and is placed in a measurement device as illustrated in Figs. 1 and 3. In Fig. 3, a recess 28 is formed on the upper surface of the panel 11 and a scale 29 is provided in one side end part of the recess and the sample piece 27 is fixed at one end in the opposite side end part of the recess by means of a stop 30. The recess is covered by a transparent plate 31 provided with a number of small holes 32 to expose the sample 27 to the conditions of the outside atmosphere. The sample 27 is thus allowed to shrink or elongate according to the change of temperature and moisture of the outside atmosphere and the degree of shrinkage or elongation can be determined by the scale 29.

Fig. 4 illustrates another embodiment of the measurement device. In the drawings, 27 and 27' are two sample pieces which are connected by a member 33 of a material which is influenced only little by the change of temperature and moisture, for instance, of metal. One end of the sample piece is fixed on the panel 11 by a stop element 30 and a scale 29 is provided near the free end of the sample piece 27' on the panel 11. The change of the length appearing at the scale is the total of elongation or shrinkage of the two pieces 27 and 27' and therefore it is convenient for the determination of elongation or shrinkage, particularly when the available length on the panel for the measurement device is relatively short.

Fig. 5 illustrates still another embodiment of the measurement device A of the present invention. In the drawing, 34 represents a band of a material which changes the color according to the change of humidity, for example, of cobalt chloride and is placed on the panel, while 35' are sections having different standard colors and provided along the band 34. By comparing the color of the band 34 with standard colors of the sections 35', the humidity of the atmosphere and consequently the elongation or shrinkage of the sheet due to the change of humidity can be determined. The device as described above may be provided on the magnet sound record sheet S instead of the panel 11.

In the examples as described above, it is necessary to conduct sound recording at determined conditions. But sound recording may be conducted at various conditions which are indicated by some indication device and the required adjustment may be made by measuring the amount of shrinkage or elongation at the time of reproduction in comparison with the length at the time of sound recording.

Figure 6:
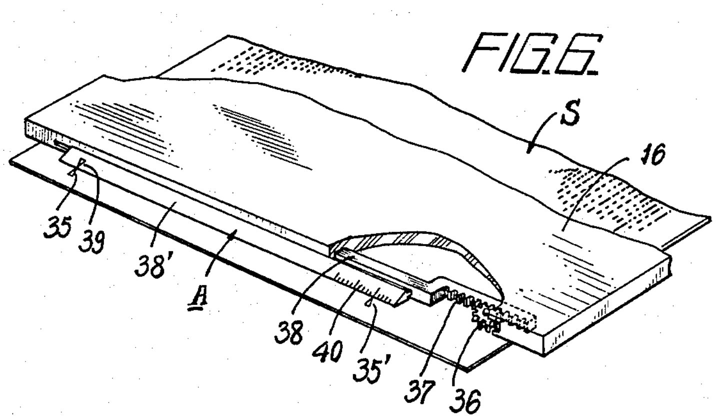
Fig. 6 is a perspective view of another embodiment of the measurement device wherein the magnetic sound record sheet itself is used for measuring the elongation or shrinkage of the same.

Fig. 6 illustrates one example of such a device. In the drawing, 35 and 35' are indication points provided on the magnetic sound record sheet S, the distance between points 35 and 35' being made to have a given length under a certain determined condition.

The pressing plate 16 in this embodiment has a sliding rod 38 on one side and said sliding rod is provided with a rack 37 which is driven by a pinion 36. The sliding rod 38 is further provided with a scale 40 fixed on the rod 38 and movable with the rod. The gauge on the scale 40 begins from the point 39 to the right as shown in the drawing. When the pressing plate 16 is turned down on the sheet S stretched on the panel of the apparatus, the pinion is operated to slide the rod 38 and the scale 40 to bring the point 39 on the scale to the point 35 on the sheet and the distance between the two points 35 and 35' of the sheet is measured. By this means, the distances between the two points 35 and 35' at the time of recording and reproducing can be measured respectively and the degree of the elongation or shrinkage of the sheet at the time of reproduction in comparison with the length of the sheet at the time of recording can be easily determined.

Figures 7, 8, 9:
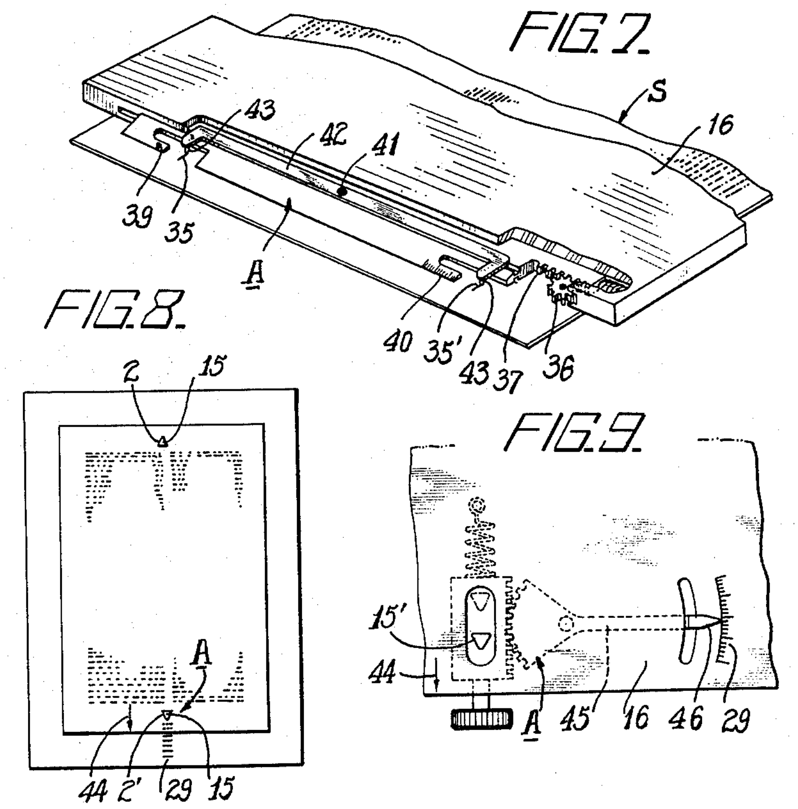
Fig. 7 is a perspective view of the measurement device in which a device for marking signs on a magnetic sound record for indicating the part of the sheet to be measured is provided on a scale.
Figs. 8 and 9 are partial plan views of measurement devices wherein setting pins for setting the magnetic sound record sheet are utilized in the measurement device.

Fig. 7 illustrates another embodiment of the measurement device in accordance with the principle of Fig. 6, but which has a special additional device for marking points 35 and 35' on the magnetic sound record sheet S at the time of sound recording and the elongation or the shrinkage of the sheet at the time of reproducing in comparison with the length at the time of recording can be more easily and directly determined.

As shown in the drawing, the sliding rod 38 is provided with an elastic metal 41 pivoted at middle point 41 on the rod. The end arms of the elastic member 42 are provided with marking elements 43, 43 which may be pencils. Immediately after the magnetic sound record sheet S set on the panel under the pressing plate 16 is recorded, the elastic member 42 is pressed down on the magnetic sound sheet S and is rotated a little around the pivot 41 to mark points 35 and 35' on the sheet S.

In the reproduction of the recorded sound, the scale 40 is moved together with the rod 36 by means of the rack 37 and the pinion 36 to bring the starting point or zero point of the scale 40 to the point 35 on the sheet S to measure the distance between the two points 35 and 35'. Since the metallic member 42 has substantially same length despite the change of the temperature and humidity, the distance between the two marking elements 43, 43 may be considered constant. Accordingly if it is so arranged that the position of the marking element on one end coincides with the zero point of the scale 40, the distance between the other marking element on the other end of the metallic member 42 and the point 35' on the sheet S at the time of reproduction will represent the elongation or shrinkage of the part between the two points 35 and 35' of sheet S, and hence it can be easily and directly determined.

Figs. 8 and 9 illustrate still different embodiments of the measurement device of the present invention wherein the elongation or shrinkage of the magnetic sound record sheet is measured by the distance between the two setting holes of the sheet. In Fig. 8, the panel 16 is provided with a scale 29. One of the setting pins 15 is fixed on the panel while the other setting pin 15' is shiftable in the direction of arrow 44 according to the elongation or shrinkage of the magnetic sound record sheet S. One of the setting holes 2 of sheet S is engaged with the fixed pin 15 and the other setting hole 2' is engaged with the shiftable setting pin 15', which stretches the sheet on the panel when released. The amount of elongation or shrinkage of the sheet may be measured by the end of the sheet with the scale 29 on the panel 16. In the embodiment of Fig. 9, the shiftable setting pin 15' is provided with a rack in meshing with a sector gear having an arm 45 and a pointer 46. The magnitude of elongation or shrinkage is magnified through the gear having the arm 45 and the pointer 46 and is indicated by a scale 29 provided on the panel.

In the above, several embodiments of the device for measuring the elongation and shrinkage of the sheet is explained. According to the present invention, the panel 11 supporting the magnetic sound record shift is movable minutely by turning a screw 20 (see Fig. 11). Now the elongation or shrinkage of the record sheet is known. Therefore by dividing the elongation or shrinkage in fractions and turning the screw 20 for shifting the panel in one direction or the other from time to time by the length corresponding to one fraction, substantial accumulation of discrepancy between the position of a sound track at recording and that of reproducing may be easily avoided to give good results despite the elongation or shrinkage of the sheet.

It is also possible to keep a good scanning of the sound reproducing head on the sound track by adjusting the linear longitudinal speed of the shiftable table 8 supporting the turntable 4 in accordance with the value of elongation or shrinkage of the sheet. Such an adjustment of the speed may be accomplished by the adjustment of the linear speed of the shiftable table 8 in Fig. 1, and a device for the adjustment of such speed is easily contemplated by those experienced in the art, and hence no further explanation is made as to such a device.

Figures 10, 11, 12, 13, 14:
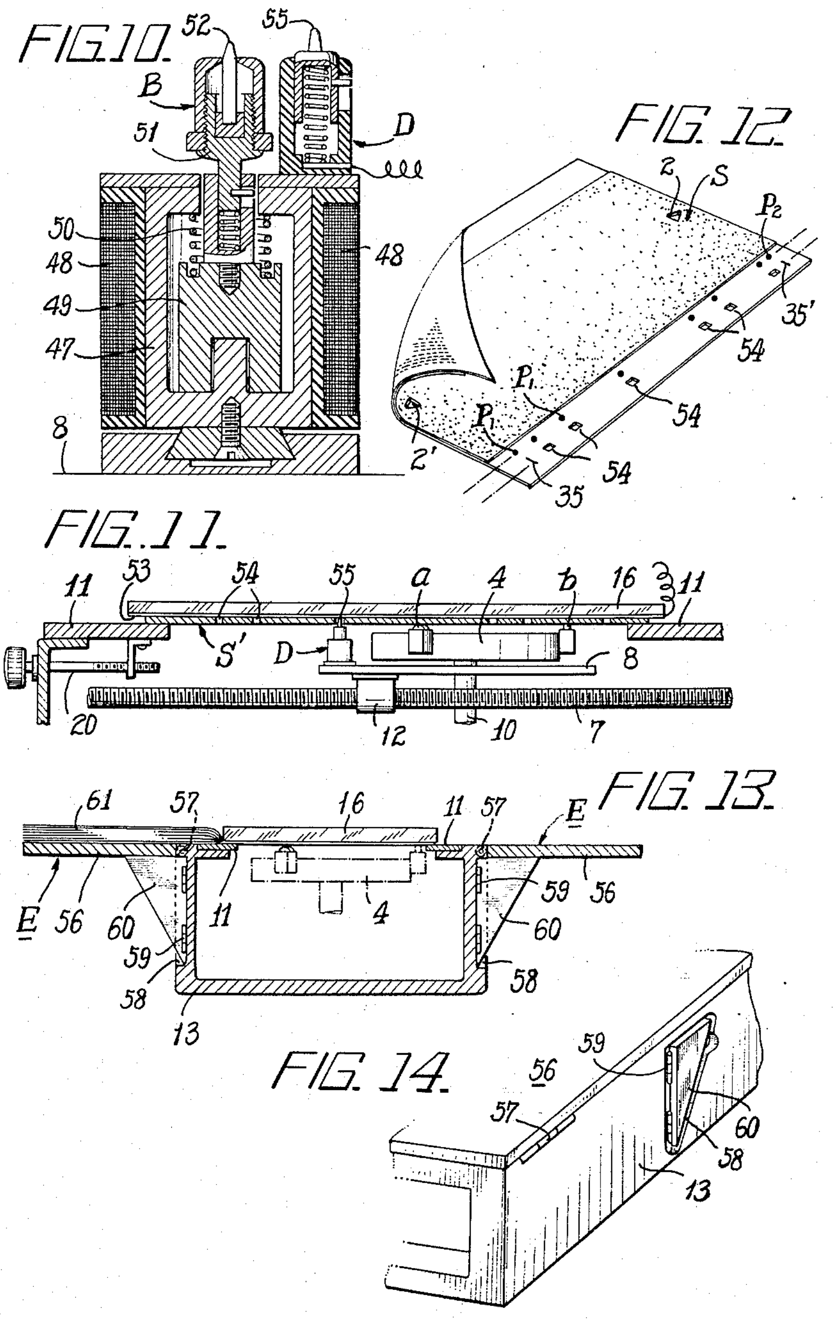
Fig. 10 is a front sectional view of the apparatus of Fig. 1 in which the signal indication and the signal despatching device are shown.
Fig. 11 is the front view of the same apparatus showing the conditions of the important elements when the apparatus is in operation.
Fig. 12 is a perspective view of a magnetic sound record sheet provided with the signals according to the present invention.
Fig. 13 is a sectional front view of the magnetic sound record reading machine provided with auxiliary tables.
Fig. 14 is a perspective view of a magnetic sound record reading machine provided with a support for a supplementary table.

Fig. 10 illustrates an embodiment of the device for marking the standard points for measurement of elongation and shrinkage of the sheet and also various other points for other purposes. As shown in the drawing, the marking device has a fixed iron core 47, a coil 48 wound around the iron core 48, and a movable iron core 49 movably installed in the fixed iron. Said movable iron core has a pen 52 held by means of a pen holder 51, and is normally pressed down by a spring 50. This marking device B in assembly is fixed on the shiftable table 8 as illustrated in Figs. 1 and 8 and is movable together with the shiftable table 8 in the direction of arrow 6. When the coil is energized instantaneously at a determined position in the operation of sound recording, the movable iron core 49 is raised to mark a point $P_1$ with the pen 52 on the lower surface of the magnetic sound record sheet S mounted on the panel 11 and being pressed by the pressing plate 16 (see also Fig. 12). When the recording is progressed and the pen 52 on the shiftable table 8 is shifted by a determined distance from the point $P_1$, the coil 48 is energized again instantaneously to raise the movable iron core 49 to mark a point $P_2$ on the sheet S. These points $P_1$ and $P_2$ may be used as the points 35 and 35' in the measurement device as illustrated in Figs. 5 and 6. But, in some cases, points separated from points $P_1$ and $P_2$ may be provided for the use of points 35, 35' in the measurement device according to the indications $P_1$ and $P_2$ on the sheet S by later operation. The marking device B of Fig. 10 may also be used for marking any point for other purposes. For example, points indicating the change of the subject matter of sound record may be provided. It is often the case that various different subject matters are recorded on one sheet and on such a case it is convenient to know the starting point of each of the different subject matters. When the device of Fig. 10 is used, such a point can be easily marked on the sheet S by simply energizing the coil 48 instantaneously when the recording of the new subject matter is to be started.

When such marking points are provided, holes 54 may be provided in the sheet S is the neighborhood of the indication of the points as shown in Fig. 12 or same small parts of conductive material such as metallic foil may be provided. These holes or small parts of conductive members may be used advantageously when some other device, for example, a magic-lantern apparatus is synhcronously operated. In such a case, a band of electrically conductive material 53 may be embedded in the pressing plate 16 along a line of the motion of a contact 55 of a signal device D fixed on the shifting plate 8 as shown in Fig. 1. In Fig. 10, said signal device is shown as a member fixed on the cover of a marking device B fixed on the shifting plate 8. Said signal device D has a contact 55 urged upwardly by a spring as shown in Fig. 10. When the magnetic sound record reading machine is operated, the shifting plate 8 is moved longitudinally and the contact 55 slides over the sheet S in a line in the band 53 of the pressing plate. But since the sheet S is made of nonconductive material, no electric conductive conduct is established until the contact 55 reaches the hole 54 of the sheet S. This contact occurring at a determined position may be utilized by controlling an operation of a certain other device, for example, a device for proceeding magic-lantern slides in series in a magic-lantern slide projector. Thus the operation of the magnetic sound record reading machine may be able to control automatically the operation of the magic-lantern apparatus.

Figs. 13 and 14 illustrate an example of the apparatus in which supplementary tables are provided. As shown in Fig. 13, supplementary tables E are hinged on the casing of the magnetic sound record reading machine at the level of the panel 11 of the machine. These supplementary tables E are supported by brackets 60 hinged on the side wall of the casing of the machine as shown in Fig. 14. When the tables E are not wanted, the support brackets may be accommodated in recesses 58 provided in the side walls 13 of the casing as shown in Fig. 14 and the supplementary tables E may be turned at the hinges 57 to hang down on the side of the casing.

These auxiliary tables E are useful, for example, for supporting a book 61 containing a plurality of magnetic sound sheets while one of the sheets is set on the panel of the machine for reproduction as shown in Fig. 13, or for writing on the sheet extended on the table or reading the descriptions of such a sheet.

These tables 56 can be hung down when not used and therefore the machine having such auxiliary tables may be made compact.

We claim:

1. In a magnetic sound recording and reading machine which comprises a panel plate for supporting a magnetic sound record sheet, a turntable rotatably mounted below the panel for scanning magnetic record tracks on the magnetic sound record sheet with transducer heads mounted on the turntable, the panel being adjustable with respect to the turntable; apparatus for placing the sound record tracks of the sound record sheet and the magnetic transducer heads in alignment despite changes in the length of the sheet resulting between the time of reproduction and the time of recording, said apparatus comprising a scale for measuring the change of length of the magnetic sound record sheet and a screw adjustment member on the machine and in engagement with said panel plate for the adjustment of the position thereof whereby the position of the panel plate in relation to the turntable can be adjusted to bring the transducer heads and magnetic sound track into alignment according to the changes of length of the sheet.

2. Apparatus according to claim 1 wherein said machine includes a pressing plate on said panel plate adapted for pressing the sheet against the plate, said apparatus comprising a rod slidably mounted on the pressing plate, said scale being fixed on said rod for the measurement of the distance between two marked points on the magnetic sound record sheet on the panel plate.

3. Apparatus according to claim 2 comprising an elastic metallic bar including marking elements and pivoted on the slidable rod for marking points on the magnetic sound record sheet at the time of sound recording by means.

4. Apparatus according to claim 1 wherein said machine includes a setting pin having an adjustable position on said panel according to the change of length of the magnetic sound record sheet in order to stretch said sheet, said scale being positioned along said adjustable pin to indicate change of length of the sheet by the change of position of said pin.

5. Apparatus according to claim 4 comprising a rack operatively associated with the adjustable pin and a sector gear including an arm and a pointer adjacent the scale said gear being engaged with the rack and the position of the pointer indicating on the scale movements of the adjustable pin.

References Cited in the file of this patent

UNITED STATES PATENTS

| | | |
|---|---|---|
| 2,772,328 | Lyon | Nov. 27, 1956 |
| 2,773,120 | Masterson | Dec. 4, 1956 |
| 2,866,012 | Ginsburg et al. | Dec. 23, 1958 |

FOREIGN PATENTS

| | | |
|---|---|---|
| 1,087,836 | France | Sept. 1, 1954 |